United States Patent

Wilkens et al.

[11] Patent Number: 5,614,161
[45] Date of Patent: Mar. 25, 1997

[54] CRYSTALLINE SHEET SODIUM SILICATE

[75] Inventors: Jan Wilkens, Hürth; Günther Schimmel, Erftstadt, both of Germany

[73] Assignee: Hoechst Aktiengesellschaft, Frankfurt, Germany

[21] Appl. No.: 604,382

[22] Filed: Feb. 21, 1996

[30] Foreign Application Priority Data

Mar. 6, 1995 [DE] Germany .................. 195 07 784.9
Jan. 15, 1996 [DE] Germany .................. 196 01 063.2

[51] Int. Cl.$^6$ .................. C01B 33/32; C04B 28/26
[52] U.S. Cl. .................. 423/332; 423/333; 423/334; 106/629; 252/175; 252/179
[58] Field of Search .................. 423/332, 333, 423/334; 106/629; 252/175, 179

[56] References Cited

U.S. PATENT DOCUMENTS

| | | | |
|---|---|---|---|
| 4,578,258 | 3/1986 | Rieck | 423/332 |
| 4,585,642 | 4/1986 | Rieck | 423/33 |
| 4,664,839 | 5/1987 | Rieck | 252/175 |
| 4,806,327 | 2/1989 | Rieck et al. | 423/332 |
| 4,820,439 | 4/1989 | Rieck | 252/135 |
| 4,950,310 | 8/1990 | Rieck et al. | 423/332 |
| 5,211,930 | 5/1993 | Schimmel et al. | 423/333 |
| 5,236,681 | 8/1993 | Chu et al. | 423/333 |
| 5,236,682 | 8/1993 | Schimmel et al. | 423/334 |
| 5,268,156 | 12/1993 | Schimmel et al. | 423/334 |
| 5,308,596 | 5/1994 | Kotzian et al. | 423/333 |
| 5,427,711 | 6/1995 | Sakaguchi et al. | 252/174.25 |
| 5,456,895 | 10/1995 | Tapper et al. | 423/332 |

FOREIGN PATENT DOCUMENTS

| | | |
|---|---|---|
| 0056094 | 7/1982 | European Pat. Off. . |
| 0164514 | 12/1985 | European Pat. Off. . |
| 0164552 | 12/1985 | European Pat. Off. . |
| 0205070 | 12/1986 | European Pat. Off. . |
| 0548599 | 6/1993 | European Pat. Off. . |
| 0550048 | 7/1993 | European Pat. Off. . |
| 3100942 | 7/1982 | Germany . |
| 3417649 | 11/1985 | Germany . |
| 4142711 | 6/1993 | Germany . |
| 4-160013 | 6/1992 | Japan . |

*Primary Examiner*—Mark L. Bell
*Assistant Examiner*—Louis M. Troilo
*Attorney, Agent, or Firm*—Connolly and Hutz

[57] ABSTRACT

The invention relates to a crystalline sheet sodium silicate of the general formula $$xNa_2O \cdot ySiO_2 \cdot zP_2O_5$$

in which
  the ratio of x to y corresponds to a number from 0.35 to 0.6,
  the ratio of x to z corresponds to a number from 1.75 to 1200
and the ratio of y to z corresponds to a number from 4 to 2800,
a process for its preparation and its use.

16 Claims, No Drawings

CRYSTALLINE SHEET SODIUM SILICATE

The invention relates to a crystalline sheet sodium silicate, a process for its preparation and its use.

The various known crystalline sodium silicates can be distinguished from one another by their composition and by their respective specific X-ray diffraction pattern. Frequently, a sodium silicate can be prepared with different crystal structures, the composition being unchanged. The individual forms generally differ from one another in their physical and chemical properties. One of the most important, synthetically obtainable sheet sodium silicates is the δ-modification of sodium disilicate, so-called SKS-6 or δ-$Na_2Si_2O_5$, which has a high ion exchange capacity for calcium and magnesium ions and is used in particular for water softening (EP-A-0 164 514).

An important parameter for the measurement of the ion exchange capacity and for the characterization of the sheet silicates is the calcium binding power (CBP) which, in a defined measuring method, indicates the amount of calcium ions which the sheet silicate is capable of binding in aqueous solution. It is very important that this ion exchange power is available as quickly as possible after the addition of the sheet silicate to water. Usually, the CBP values for the individual $Na_2Si_2O_5$ modifications or mixtures thereof are between 30 and 80 mg of $Ca^{2+}$/g of sheet silicate.

Crystalline sodium disilicates having a sheet structure can be prepared in various ways. According to DE-A- 31 00 942, crystalline sodium salts of silicic acids having an $SiO_2/Na_2O$ ratio of 2:1 to 3:1 are obtained by annealing sodium silicate glasses or by heating sodium carbonate with quartz.

DE-A-34 17 649 describes a process for the preparation of crystalline sodium silicates having a molar $SiO_2/Na_2O$ ratio of 1.9:1 to 3.5:1 from amorphous sodium silicate, seed crystals being added to hydrated amorphous sodium silicate, the reaction mixture being dehydrated by heating and the dehydrated reaction mixture being kept at a temperature which is at least 450° C. but below the melting point until the sodium silicate has crystallized. The α-, β-, γ- and δ-modifications of $Na_2Si_2O_5$ can be prepared by this method.

Willgallis and Range (Glastechn. Ber. 37 (1964), 194–200) describe the preparation of α-, β- and γ-$Na_2Si_2O_5$ by annealing molten and non-molten dehydrated soda waterglass. These products have a sheet structure; the X-ray diffraction pattern indicates the crystalline form. Depending on the temperature, the various, above mentioned crystal modifications can be obtained. However, δ-$Na_2Si_2O_5$ cannot be prepared by this process.

DE-A-41 42 711 describes a process for the preparation of crystalline sodium disilicates having a sheet structure by reacting sand with sodium hydroxide solution and spray-drying the waterglass solution thus obtained, the spray-dried, pulverulent amorphous sodium disilicate being milled, introduced into a rotary kiln and treated therein at temperatures of 400° to 800° C. for up to one hour with formation of crystalline sodium disilicate.

EP-A-0 550 048 describes an inorganic ion exchange material which corresponds to the formula $xM_2O \cdot ySiO_2 \cdot zM'O$ and in which M is Na or K, M' is Ca or Mg, y/x is 0.5–2.0 and z/x is 0.005–1.0. The further information in this publication reveals that these are very alkali-rich silicates which have a chain structure but which are evidently not obtained as a pure phase.

Finally, Japanese Preliminary Published Application Hei 4-160 013 describes a process for the preparation of δ-sodium disilicate types by mixing a boron-containing compound with an aqueous solution of an alkali metal disilicate having a molar $SiO_2/M_2O$ ratio (M=alkali metal) of from 1 to 3 and subsequently carrying out drying and calcination. The yield and crystallinity of the product is controlled mainly via the ratio $SiO_2/M_2O$.

The disadvantage of the known processes is that they either do not at all lead to a product of the composition $Na_2Si_2O_5$ or that the particularly advantageous δ-modification is not obtained in high yield but is contaminated with α-, β- and γ-$Na_2Si_2O_5$.

In particular, there is a need for crystalline sheet sodium silicate having a high ion exchange capacity for $Ca^{2+}$ions in aqueous solution.

It was therefore the object of the invention to provide a crystalline sheet sodium silicate which in particular has a high ion exchange capacity with respect to $Ca^{2+}$ions. Preferably, the calcium binding power should assume as high a value as possible only shortly after the addition of the sheet sodium silicate to water.

This object is achieved by a crystalline sheet sodium silicate as claimed in claim 1, having the formula $xNa_2O \cdot ySiO_2 \cdot zP_2O_5$, in which the ratio of x to y corresponds to a number from 0.35 to 0.6, the ratio of x to z corresponds to a number from 1.75 to 1200 and the ratio of y to z corresponds to a number from 4 to 2800.

In the abovementioned formula, the ratio of x to y preferably corresponds to a number from 0.40 to 0.57, that of x to z to a number from 8 to 400 and that of y to z to a number from 20 to 800.

Particularly preferably, x to y corresponds to a number from 0.45 to 0.55, x to z to a number from 15 to 200 and y to z to a number from 40 to 400.

In particular, the last-mentioned compositions lead to sheet sodium silicates according to the invention which have high crystallinity and a very high calcium binding power of more than 85 mg of $Ca^{2+}$/g of sheet sodium silicate, preferably of more than 90 mg of $Ca^{2+}$/g of sheet sodium silicate.

CBP values of more than 100 mg of $Ca^{2+}$/g of sheet sodium silicate can regularly be achieved with the sheet sodium silicates according to the invention.

There is also a need for a simple process for the crystallization of the abovementioned crystalline sheet sodium silicates according to the invention in a wide temperature range in as high a yield as possible.

This object is achieved by a process for the preparation of a crystalline sheet sodium silicate of the general formula $xNa_2O \cdot ySiO_2 \cdot zP_2O_5$, in which x, y and z have the above-mentioned meaning, which comprises mixing a phosphorus-containing compound in an aqueous medium with a silicate compound, reacting them and carrying out partial dehydration and then calcination.

Suitable phosphorus-containing compounds are those of the general formula $H_{n+2}P_nO_{3n+1}$ (n=1 to 6), $H_nP_nO_{3n}$ (n=3 to 8) and $HPO_3$ and their alkali metal salts and/or diphosphorus pentoxide.

For example, silica, silica gel, soda waterglass and/or quartz sand may be used as the silicate compound.

The partial dehydration of the mixture of the phosphorus-containing compound and the aqueous solution of the silicate compound is carried out at 80° to 300° C., preferably at 105° to 220° C., and leads to amorphous, hydrated products whose losses on ignition (720°C., 1 h) are between 1 and 22% by weight.

In the process according to the invention, calcination is carried out at 560° to 840° C., preferably at 600° to 780° C.

The time for the calcination is not critical and is in general 0.5 to 5 hours.

The sheet sodium silicates according to the invention are outstandingly suitable for softening water which contains calcium ions and/or magnesium ions.

The sheet sodium silicates according to the invention can also be used as builders in many fields of use.

The sheet sodium silicates according to the invention are preferably used in detergents and cleaning agents.

In addition to the outstanding primary washing action, an improved secondary washing action is also noteworthy. This is evident in particular from substantially reduced incrustation of the fabric washed with the sheet sodium silicate according to the invention.

In the following Examples, in which the invention is described in more detail, the calcium binding power of the crystalline sodium disilicates obtained was determined as follows:

Method 1

30 g of a calcium solution (131.17 g of $CaCl_2 \cdot 2H_2O$ are dissolved in distilled water and made up to 5000 g) are mixed with 5.6 g of a buffer solution (75.07 g of glycine and 58.4 g of NaCl are dissolved in distilled water and made up to 1000 ml) and made up to 999 g with distilled water. This solution, which corresponds to a water hardness of 30° dH or 300 mg of CaO/l, is thermostated at 20° C. and 1 g of sample is added. The solution was stirred for a certain time (e.g. 10 minutes) and filtered, and the calcium remaining in the solution was determined complexometrically in the filtrate. The calcium binding power, generally referred to as the CBP value, was determined by calculating the difference with respect to the original calcium content.

Method 2

The calcium stock solution comprises 157.30 g of $CaCl_2 \cdot 2H_2O$, which is dissolved in distilled water and made up to 1000 ml. For the preparation of the buffer solution, 88.5 g of glycine and 69.04 g of NaCl are dissolved in 520 ml of 1N sodium hydroxide solution and made up to 2000 ml with distilled water.

980 ml of distilled water, 20 ml of buffer solution and a total of 5 ml of calcium stock solution are mixed and thermostated at 20° C. The resulting water hardness likewise corresponds to 30° dH. After the addition of 1 g of sample substance, the concentration of free calcium is continuously detected with the aid of an ion-sensitive electrode (e.g. from ORION, Model 900 200). The CBP value after 1 minute and after 3 minutes is stated in the following Examples as a measure of the rapidity of water softening.

The primary washing action of the textile detergent was determined at 60° C. for various test fabrics according to DIN 53 919, by determining the difference in the reflectance of the test fabric after and before washing. The secondary washing action was likewise determined at 60° C. for various test fabrics according to DIN 53 919.

EXAMPLE 1

A stirred autoclave—having a total capacity of 0.25 l and equipped with a Teflon Inliner—was filled with 230 g of a mixture of 113.6 g of sodium hydroxide solution (50% by weight), 13.57 g of $Na_3PO_4 \cdot 12H_2O$, 88.8 g of silica (Wacker HDK T30) and 60 g of distilled water, heated to 200° C. (corresponding to about 15 bar) and kept at this temperature for 90 minutes. The product was removed, spray-dried and then calcined for one hour at 720° C. Analysis shows that the end product contains 8100 ppm of phosphorus. With the aid of the X-ray diffraction pattern, the phosphorus-containing product can be interpreted as a sheet silicate analogous to the metastable δ-modification of $Na_2Si_2O_5$.

The calcium binding power of the product was determined by Method 1 as 101 mg of $Ca^{2+}/g$. According to Method 2, a CBP value of 98 mg of $Ca^{2+}/g$ can be determined after 1 minute or 98 mg of $Ca^{2+}/g$ after 3 minutes.

EXAMPLE 2

The procedure was analogous to that of Example 1, except that the calcination temperature was varied according to Table 1. The X-ray diffraction patterns of the phosphorus-containing products can be interpreted using the data known from the literature for the various modifications of $Na_2Si_2O_5$. An estimation of the phase compositions determined by X-ray diffraction and the CBP values of the phosphorus-containing sheet silicates are also shown in Table 1.

EXAMPLE 3 (Comparative Example)

The procedure was analogous to that of Examples 1 and 2, except that no phosphorus compound was added to the batch. The results obtained are shown in Table 2.

EXAMPLE 4

A stirred autoclave—having a total capacity of 0.25 l and equipped with a Teflon Inliner—was filled with 230 g of a mixture of 113.6 g of sodium hydroxide solution (50% by weight), 27.13 g of $Na_3PO_4 \cdot 12H_2O$, 96.6 g of silica (Wacker HDK T30) and 45 g of distilled water, heated to 200° C. (corresponding to about 15 bar) and kept at this temperature for 90 minutes. The product was removed, spray-dried and then calcined for one hour at 720° C. Analysis shows that the end product contains 14500 ppm of phosphorus. The X-ray diffraction pattern of the phosphorus-containing product can be interpreted as a sheet silicate analogous to the δ-phase.

The calcium binding power of the product was determined by Method 1 as 104 mg of $Ca^{2+}/g$. According to Method 2, a CBP value of 104 mg of $Ca^{2+}/g$ can be determined after 1 minute or 102 mg of $Ca^{2+}/g$ after 3 minutes.

EXAMPLE 5

The procedure was analogous to that of Example 4, except that the calcination was carried out at 700° C. The X-ray diffraction pattern of the phosphorus-containing product can be interpreted substantially as a sheet-silicate analogous to the δ-phase. The proportion of the crystalline low-temperature modification (β-phase) is less than 25%; a high-temperature modification analogous to the α-phase cannot be detected by X-ray diffraction.

The calcium binding power of the product was determined by Method 1 as 113 mg of $Ca^{2+}/g$. According to Method 2, a CBP value of 114 mg of $Ca^{2+}/g$ can be determined after 1 minute or 114 mg of $Ca^{2+}/g$ after 3 minutes.

EXAMPLE 6

A stirred autoclave—having a total capacity of 0.25 l and equipped with a Teflon Inliner—was filled with 230 g of a mixture of 113.6 g of sodium hydroxide solution (50% by weight), 1.60 g of $Na_3PO_4 \cdot 12H_2O$, 86.6 g of silica (Wacker HDK T30) and 60 g of distilled water, heated to 200° C. (corresponding to about 15 bar) and kept at this temperature for 90 minutes. The product was removed, spray-dried and then calcined for one hour at 720° C. Analysis shows that the end product contains 995 ppm of phosphorus. The X-ray diffraction pattern of the phosphorus-containing product can be interpreted as a sheet silicate analogous to the δ-phase.

The calcium binding power of the product was determined by Method 1 as 104 mg of $Ca^{2+}$/g. According to Method 2, a CBP value of 104 mg of $Ca^{2+}$/g can be determined after 1 minute or 102 mg of $Ca^{2+}$/g after 3 minutes.

EXAMPLE 7

A stirred autoclave—having a total capacity of 0.25 l and equipped with a Teflon Inliner—was filled with 230 g of a mixture of 116.4 g of sodium hydroxide solution (50% by weight), 2.05 g of phosphoric acid (85% strength), 86.6 g of silica (Wacker HDK T30) and 60 g of distilled water, heated to 200° C. (corresponding to about 15 bar) and kept at this temperature for 90 minutes. The product was removed, spray-dried and then calcined for one hour at 720° C. Analysis shows that the end product contains 4500 ppm of phosphorus. The X-ray diffraction pattern of the phosphorus-containing product can be interpreted substantially as a sheet silicate analogous to the δ-phase; the proportion of the α-phase is less than 10%.

The calcium binding power of the product was determined by Method 1 as 98 mg of $Ca^{2+}$/g. According to Method 2, a CBP value of 98 mg of $Ca^{2+}$/g can be determined after 1 minute or 99 mg of $Ca^{2+}$/g after 3 minutes.

EXAMPLE 8

The procedure was analogous to that of Example 7, except that the calcination was carried out at 680° C. The X-ray diffraction pattern of the phosphorus-containing product can be interpreted substantially as a sheet-silicate analogous to the δ-phase. The proportion of the crystalline low-temperature modification (β-phase) is substantially less than 50%; a high-temperature modification analogous to the α-phase cannot be detected by X-ray diffraction.

The calcium binding power of the product was determined by Method 1 as 108 mg of $Ca^{2+}$/g. According to Method 2, a CBP value of 114 mg of $Ca^{2+}$/g can be determined after 1 minute or 114 mg of $Ca^{2+}$/g after 3 minutes.

EXAMPLE 9

The detergent formulations were prepared according to Table 3 from the various individual components by the spray mixing process familiar to persons skilled in the art. For comparison purposes, a commercial crystalline sheet sodium silicate (SKS-6, from Hoechst AG, calcium binding power of 82 mg of $Ca^{2+}$/g according to Method 1) was used in formulation A. Formulation B contains a sheet sodium silicate according to the invention, containing 8100 ppm of phosphorus (α-phase<10%, β-phase <15%, δ-phase<75%; calcium binding power of 104 mg of $Ca^{2+}$/g according to Method 1). It should be pointed out that no polycarboxylates were added to either of the two formulations, in order to be able better to assess the incrustation behavior.

The washing tests were carried out with a dose of 65 g of washing powder per washing cycle at a total water hardness of 18° dH (Ca: Mg ratio=5:1) and a temperature of 60° C. The washing machines were loaded with 3.75 kg of dry linen.

The results for the primary washing performance are shown in Table 4, and those for the incrustation behavior in Table 5.

TABLE 1

| Calcination temperature | Content [%] | | | CBP Method 1 (10 min) | CBP Method 2 (1 min) | CBP Method 2 (3 min) |
| --- | --- | --- | --- | --- | --- | --- |
| | α-Phase | β-Phase | δ-Phase | | | |
| 660° C. | 0 | ~50 | ~50 | 113 | 105 | 120 |
| 680° C. | 0 | <50 | >50 | 115 | 100 | 115 |
| 720° C. | 0 | 0 | 100 | 101 | 98 | 98 |
| 740° C. | 0 | 0 | 100 | 100 | 100 | 102 |
| 780° C. | <10 | 0 | >90 | 96 | 95 | 96 |

TABLE 2

| Calcination temperature | Content [%] | | | CBP Method 1 (10 min) | CBP Method 2 (1 min) | CBP Method 2 (3 min) |
| --- | --- | --- | --- | --- | --- | --- |
| | α-Phase | β-Phase | δ-Phase | | | |
| 700° C. | 0 | <50 | >50 | 80 | 68 | 75 |
| 720° C. | 0 | <25 | >75 | 82 | 73 | 82 |
| 740° C. | <10 | 0 | >90 | 82 | 75 | 81 |
| 760° C. | <50 | 0 | >50 | 74 | 61 | 70 |

TABLE 3

Composition of the detergent formulations (in % by weight)

| Ingredient | Formulation A | Formulation B |
| --- | --- | --- |
| Builder (SKS-6) | 39.30 | 0.00 |
| Builder (SKS-6P) | 0.00 | 39.30 |
| Anionic surfactant (LAS) | 11.00 | 11.00 |
| Nonionic surfactant (5 EO) | 3.10 | 3.10 |
| Nonionic surfactant (7 EO) | 3.10 | 3.10 |
| Silicone-based antifoam | 0.47 | 0.47 |
| Optical brightener | 0.28 | 0.28 |
| Enzyme (proteases) | 1.60 | 1.60 |
| Enzyme (amylases) | 1.60 | 1.60 |
| Bleaching substance (sodium perborate monohydrate) | 23.60 | 23.60 |
| Bleach activator (TAED) | 6.30 | 6.30 |
| Standardizing agent (sodium sulfate) | 6.55 | 6.55 |

TABLE 4

Primary washing performance (in % difference in reflectance)

| Fabric | Formulation A | Formulation B |
| --- | --- | --- |
| Cotton standard EMPA 101 | 17.4 | 18.5 |
| Polyester/cotton 2:1 EMPA 104 | 18.0 | 20.0 |
| Cotton standard WFK 10D | 24.8 | 25.1 |
| Polyester standard WFK 30D | 16.4 | 22.0 |
| Mean value | 19.2 | 21.4 |

TABLE 4-continued

| | Primary washing performance (in % difference in reflectance) | |
|---|---|---|
| Fabric | Formulation A | Formulation B |
| Cotton EmPA 112 | 32.7 | 37.8 |
| Cotton EMPA 116 | 36.9 | 37.1 |
| Cotton CFT A10 | 34.7 | 31.8 |
| Mean value | 34.8 | 35.6 |
| Cotton CFT BC1 | 15.3 | 16.9 |
| Cotton CPT BC4 | 18.2 | 18.3 |
| Cotton CFT CS3 | 42.7 | 43.6 |
| Mean value | 25.4 | 1.75 |

TABLE 5

| | Incrustation behavior (in % ash after 25 wash cycles) | |
|---|---|---|
| Fabric | Formulation A | Formulation B |
| Terry fabric (from Vossen) | 3.79 | 1.94 |
| Cotton EMPA | 2.57 | 1.34 |
| Cotton WFK | 2.97 | 2.45 |
| Polyester/cotton 2:1 WFK | 3.00 | 1.31 |
| Double rib WFK | 3.25 | 1.73 |
| Mean value | 3.12 | 1.75 |

We claim:

1. A crystalline sheet sodium silicate of the formula $xNa_2O \cdot ySiO_2 \cdot zP_2O_5$ in which the ratio of x to y corresponds to a number from 0.35 to 0.6, the ratio of x to z corresponds to a number from 1.75 to 1200 and the ratio of y to z corresponds to a number from 4 to 2800.

2. The crystalline sheet sodium silicate as claimed in claim 1, wherein the ratio of x to y corresponds to a number between 0.4 and 0.57, the ratio of x to z corresponds to a number from 8 to 400 and the ratio of y to z corresponds to a number from 20 to 800.

3. The crystalline sheet sodium silicate as claimed in claim 1, wherein the ratio of x to y corresponds to a number from 0.45 to 0.55, the ratio of x to z corresponds to a number from 15 to 200 and the ratio of y to z corresponds to a number from 40 to 400.

4. The crystalline sheet sodium silicate as claimed in claim 1, which has a calcium binding power of at least 85 mg of $Ca^{2+}$/g of sheet silicate.

5. The crystalline sheet sodium silicate as claimed in claim 4, which has a calcium binding power of at least 90 mg of $Ca^{2+}$/g of sheet silicate.

6. A process for the preparation of a crystalline sheet sodium silicate of the formula $xNa_2O \cdot ySiO_2 \cdot zP_2O_5$, in which x, y and z have the meanings stated in claim 1, which comprises mixing a phosphorus-containing compound in an aqueous medium with a silicate compound and reacting them, and carrying out partial dehydration and then calcination.

7. The process as claimed in claim 6, wherein the phosphorus containing compound is selected from the group consisting of compounds of the formula $H_{n+2}P_nO_{3n+1}$ where n=1 to 6 or alkali metal salts, compounds of the formula $H_nP_nO_{3n}$ where n=3 to 8 or alkali metal salts, $HPO_3$ or an alkali metal salt, diphosphorus pentoxide, and mixtures thereof.

8. The process as claimed in claim 6, wherein the silicate compound is silica, silica gel, soda water-glass or quartz sand.

9. The process as claimed in claim 6, wherein partial dehydration is carried out at 80° to 300° C.

10. The process as claimed in claim 6, wherein partial dehydration is carried out at 105° to 220° C.

11. The process as claimed in claim 6, wherein the loss on ignition of the amorphous products at 720° C. and for an ignition time of 1 h is between 1 and 22% by weight.

12. The process as claimed in claim 6, wherein calcination is carried out at 560° to 840° C.

13. The process as claimed in claim 6, wherein calcination is carried out at 600° to 780° C.

14. The process as claimed in claim 6, wherein calcination is carried out for 0.5 to 5 h.

15. The process as claimed in claim 6, wherein partial dehydration is carried out by means of spray-drying.

16. The process as claimed in claim 6, wherein partial dehydration is carried out by means of a drying oven.

* * * * *